(12) United States Patent
Lunttila et al.

(10) Patent No.: US 8,787,295 B2
(45) Date of Patent: *Jul. 22, 2014

(54) CHANNEL QUALITY SIGNALING FOR PERSISTENT/SEMI-PERSISTENT RADIO RESOURCE ALLOCATIONS

(71) Applicant: Nokia Siemens Networks Oy, Espoo (FI)

(72) Inventors: Timo Lunttila, Espoo (FI); Jussi Ojala, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,330

(22) Filed: Jan. 7, 2013

(65) Prior Publication Data

US 2013/0121287 A1    May 16, 2013

Related U.S. Application Data

(63) Continuation of application No. 12/455,619, filed on Jun. 3, 2009, now Pat. No. 8,351,382.

(60) Provisional application No. 61/130,991, filed on Jun. 4, 2008.

(51) Int. Cl.
  *H04W 4/00* (2009.01)
  *H04L 12/60* (2006.01)
  *H04W 72/04* (2009.01)
  *H04W 72/08* (2009.01)

(52) U.S. Cl.
  CPC ........ *H04W 72/0466* (2013.01); *H04W 72/085* (2013.01); *H04W 72/0413* (2013.01)
  USPC ........ 370/329; 370/352; 370/389; 455/452.1; 375/259

(58) Field of Classification Search
  CPC ..................................................... H04L 1/1607
  USPC ..................... 370/329–774; 455/452.1–509; 375/223–259
  See application file for complete search history.

(56) References Cited

U.S. PATENT DOCUMENTS 8,351,382 B2 *   1/2013   Lunttila et al. ................. 370/329
2009/0274107 A1  11/2009  Park et al. ..................... 370/329
(Continued)

FOREIGN PATENT DOCUMENTS

WO     WO 03/094363 A2     11/2003
WO     WO-2005-072073 A2    8/2005
WO     WO 2008/024890 A2    2/2008

OTHER PUBLICATIONS

3GPP TSG RAN1 #50-bis, R1-074016, "Uplink Control Signaling with Persistent Scheduling", Oct. 8-12, 2007, Shanghai, China, XP050107567, 3 pages.
(Continued)

*Primary Examiner* — Afsar M Qureshi
(74) *Attorney, Agent, or Firm* — Harrington & Smith

(57) ABSTRACT

A persistent or a semi-persistent uplink resource allocation also comprises an indication for a user equipment UE to send channel quality reports. The format for the channel quality report is determined (based on a transmission mode for which the UE receives a downlink shared channel). In at least first transmissions of user data for instances of the persistently allocated uplink resource the UE sends user data and a channel quality report according to the determined format. For the case that a NACK is received in reply to one of those sent user data with channel quality reports, four options are detailed: re-send the NACK'd user data on a next instance of the persistently allocated UL resource with or without a channel quality report, and re-send the NACK'd user data on a dynamically allocated uplink resource with or without a channel quality report.

13 Claims, 4 Drawing Sheets

(56) References Cited

U.S. PATENT DOCUMENTS

| | | | |
|---|---|---|---|
| 2011/0211510 A1* | 9/2011 | Kim et al. | 370/311 |
| 2013/0242915 A1* | 9/2013 | Lee et al. | 370/329 |
| 2013/0287047 A1* | 10/2013 | Tanaka et al. | 370/496 |
| 2014/0064218 A1* | 3/2014 | Kim et al. | 370/329 |

OTHER PUBLICATIONS

3GPP TSG-RAN WG1 Meeting #49, R1-072077, "CQI Feedback Control and Content in E-UTRA", May 7-11, 2007, Kobe, Japan. XP050105831, 5 pages.

3GPP TSG RAN WG2 #56, R2-063276, "CQI reporting procedure for downlink scheduling", Nov. 6-10, 2006, Riga, Latvia, XP050132765, 3 pages.

3GPP TSG RAN WG2 ad-hoc on LTE, R2-061908, "CQI reporting principles to support LTE scheduling", Jun. 27-30, 2006, Cannes, France, XP050141941, 2 pages.

"3$^{rd}$ Generation Partnership Project: Technical Specification Group Radio Access Network; Evolved Universal Terrestrial Radio Access (E-UTRA); Physical layer procedures (Release 8)", 3GPP TS 36.213 V8.2.0, Mar. 2008, 30 pgs.

"Tx Mode vs DCI format is clarified", 3GPP TSG-RAN Meeting #53, R1-082254, May 2008, 3 pgs.

"CQI request in UL SPS transmission", 3GPP TSG-RAN WG1 #56bis, R1-091481, Mar. 2009, 2 pgs.

* cited by examiner

CHANNEL QUALITY SIGNALING FOR PERSISTENT/SEMI-PERSISTENT RADIO RESOURCE ALLOCATIONS

CROSS REFERENCE TO RELATED APPLICATION

This application is a continuation of prior U.S. patent application Ser. No. 12/455,619, filed Jun. 3, 2009, now U.S. Pat. No. 8,351,382, issued on Jan. 8, 2013 which claims the benefit of U.S. Provisional Application No. 61/130,991, filed Jun. 4, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to techniques for signalling channel quality indications between a network and a portable communication device particularly when the communication device is operating under a persistent (or semi-persistent) resource allocation.

BACKGROUND

The following abbreviations are herewith defined:
3GPP third generation partnership project
AT allocation table (PDCCH)
CQI channel quality indicator/indication
DL downlink
DRX/DTX discontinuous reception/discontinuous transmission
eNB evolved nodeB (of an LTE system)
E-UTRAN evolved UTRAN (LTE or 3.9G)
LTE long term evolution of 3GPP
MAC medium access control
MCS modulation and coding scheme
Node B base station or similar network access node
PDCCH physical downlink control channel
PRB physical resource block
PS packet scheduler
PUCCH physical uplink control channel
RRC radio resource control
TTI transmission time interval
UE user equipment (e.g., mobile equipment/station)
UL uplink
UMTS universal mobile telecommunications system
UTRAN UMTS terrestrial radio access network
VoIP voice over IP (internet protocol)

A proposed communication system known as evolved UTRAN (E-UTRAN, also referred to as UTRAN-LTE, E-UTRA or 3.9G) is currently under development within the 3GPP. One specification of interest to these and other issues related to the invention is 3GPP TS 36.213, V8.2.0 (2008-03), 3rd Generation Partnership Project; Technical Specification Group Radio Access Network; Evolved Universal Terrestrial Radio Access (E-UTRA); Physical layer procedures (Release 8), which is attached to the priority document as Exhibit A.

Relevant to this invention is the concept of resource allocations on a common channel over which multiple users receive resources specifically allocated to only one of them. LTE is one such system that employs this concept. In LTE, the network assigns resources to UE's using the physical downlink control channel (PDCCH, also referred to as allocation table AT). The network schedules UE's at certain points in time which are clearly defined and synchronized between the network and the various UEs being allocated. These instants in time are also referred to as DRX timeout periods (from the UE point of view). This allows the UE to re-tune its receiver from its downlink data channel to the PDCCH in a manner in which it will not miss transmissions scheduled for it on either channel, and to conserve its battery power by operating in a reduced power state (except for scheduled paging instances) when not scheduled to receive. A similar scheduling option exists on the UE's transmit side, termed a DTX period.

At each DRX the UE will read one or more PDCCH (this specific amount is also 'negotiated' or otherwise commanded by the network previously, e.g. during setup of a connection with the UE) in which the UE may then be assigned UL and/or DL resources by the network.

This flexibility for scheduling resources leads to the potential for two problems, most pronounced when there is a large number of active users all generating a large amount of small data packages with tight delay constraints (e.g. VoIP, gaming etc.). This dynamic scheduling can then lead to large control signaling overhead compared to the actual transferred data, or to the wasting of air interface resources due to lack of addressing possibilities (not enough space in AT/PDCCH for addressing a sufficient number of UEs to allocate all available resources).

The LTE system and others address those problems with the concept of persistent scheduling, where a resource allocated to a particular UE remains a valid allocation for more than the next TTI. This means that the UL or DL resources are allocated in a persistent manner, i.e. the resource allocation is given by the network only in the beginning of the data transmission, not for each data packet separately. In semi persistent allocation only the first transmissions use the persistent allocation while retransmissions are explicitly scheduled. The agreement in 3GPP radio access network working group 2 (RAN WG2) is to allocate the resources for persistent transmissions using PDCCH signalling.

With persistent/semi-persistent allocations comes the problem of how to inform the network of channel quality. In LTE it has been agreed that an eNB can at any time request a UE to send an aperiodic CQI report by sending it an uplink grant with an aperiodic CQI trigger flag set to "on". The latest agreement in 3GPP is not to support periodic CQI transmission on the PUSCH. However, the inventors have determined that PUSCH-based reporting formats could potentially provide gains in persistent/semi-persistent allocation scenarios, because transmission of UL grants for the sole purpose of triggering an aperiodic CQI reports becomes costly in term of PDCCH resource consumption.

It was agreed in the RAN WG1 meeting 52bis in Shenzhen, China to not include periodic CQI reporting on the PUSCH into the LTE specification, and in fact aperiodic reports can anyway be triggered periodically by the eNB. However, with persistent/semi-persistent allocations there can be potential issues, since when there is a large number of users, triggering aperiodic CQI reports with a UL grant becomes very inefficient. This is exactly the situation that would exist when there is a need for many persistent allocations. One possibility would be to utilize the PUCCH based CQI formats. However they are not able to deliver detailed frequency information to assist the eNB in the scheduling decision due to the low number of payload bits. Moreover, the DRX pattern might limit the possibilities to send PUCCH based CQI for users concentrated for VoIP. Hence there is clearly a need for a mechanism to be able to efficiently get detailed CQI information with the (semi) persistent transmissions.

SUMMARY

In one exemplary aspect of the invention there is a method that comprises receiving (e.g., at a receiver) a persistent or a semi-persistent uplink resource allocation that also comprises an indication to send channel quality reports; determining (e.g., by a processor) a format for a channel quality report; and in at least first transmissions of user data for instances of the persistently or semi-persistently allocated uplink resource, sending (e.g., from a transmitter) user data and a channel quality report according to the determined format.

In another exemplary aspect of the invention there is a computer readable memory storing a program of machine readable instructions (computer readable code) that when executed by a processor result in actions that comprise: in response to receiving a persistent or a semi-persistent uplink resource allocation that also comprises an indication to send channel quality reports, determining a format for a channel quality report; and in at least first transmissions of user data for instances of the persistently or semi-persistently allocated uplink resource, sending user data and a channel quality report according to the determined format.

In yet another exemplary aspect of the invention there is an apparatus (e.g., a user equipment) which comprises a receiver, a processor and a transmitter. The receiver is configured to receive a persistent or a semi-persistent uplink resource allocation that also comprises an indication to send channel quality reports. The processor is configured to determine a format for a channel quality report. The transmitter is configured to send, in at least first transmissions of user data for instances of the persistently or semi-persistently allocated uplink resource, user data and a channel quality report according to the determined format.

In still another exemplary aspect of the invention there is an apparatus which comprises receiving means, processing means and sending means. The receiving means is for receiving a persistent or a semi-persistent uplink resource allocation that also comprises an indication to send channel quality reports. The processing means is for determining a format for a channel quality report. The sending means if for sending, in at least first transmissions of user data for instances of the persistently or semi-persistently allocated uplink resource, user data and a channel quality report according to the determined format.

In a further exemplary aspect of the invention there is a method comprising: sending (e.g., from a transmitter) to a user equipment a persistent or a semi-persistent uplink resource allocation that also comprises an indication to send channel quality reports; and in at least first transmissions of user data for instances of the persistently or semi-persistently allocated uplink resource, receiving (e.g., at a receiver) from the user equipment user data and a channel quality report.

In yet a further exemplary aspect of the invention there is there is a computer readable memory storing a program of machine readable instructions (computer readable code) that when executed by a processor result in actions that comprise: sending to a user equipment a persistent or a semi-persistent uplink resource allocation that also comprises an indication to send channel quality reports; and in at least first transmissions of user data for instances of the persistently or semi-persistently allocated uplink resource, receiving from the user equipment user data and a channel quality report In a still further exemplary aspect of the invention there is an apparatus (e.g., an access node/eNB) comprising a transmitter and a receiver. The transmitter is configured to send to a user equipment a persistent or a semi-persistent uplink resource allocation that also comprises an indication to send channel quality reports. The receiver is configured, in at least first transmissions of user data for instances of the persistently or semi-persistently allocated uplink resource, to receive from the user equipment user data and a channel quality report.

In another further exemplary aspect of the invention there is an apparatus comprising sending means and receiving means. The sending means is for sending to a user equipment a persistent or a semi-persistent uplink resource allocation that also comprises an indication to send channel quality reports. The receiving means is for receiving from the user equipment user data and a channel quality report, in at least first transmissions of user data for instances of the persistently or semi-persistently allocated uplink resource.

BRIEF DESCRIPTION OF THE DRAWINGS

The foregoing and other aspects of the exemplary embodiments of this invention are made more evident in the following Detailed Description, when read in conjunction with the attached Drawing Figures.

DETAILED DESCRIPTION

Though not limited thereto, embodiments of this invention are particularly advantageous for use in an E-UTRAN (also known as LTE or 3.9G) system, and relate to CQI-related signalling in the context of persistent/semi-persistent resource allocations. Detailed below is a novel approach to allowing for CQI reports which can be embedded into a persistent UL transmission without explicit triggering at each transmission interval, and without expanding the control signaling already used in LTE for resource allocations. While the concept is described with reference to LTE, that description is by example only and not a limitation; these teachings may be readily extended to other communication systems other than E-UTRAN.

In an embodiment of the invention, when the UE is given a persistent or semi-persistent UL resource allocation in which a CQI indicator is set to a value indicating 'ON', then the UE will send a CQI report with each of the first transmissions that it sends on the persistently/semi-persistently allocated UL resource. In a variation, the UE will also send a CQI report with each re-transmission that it sends on the persistently/semi-persistently allocated UL resource. This avoids the need to trigger the CQI report with separate control signaling for each of them from the network; the single flag or bit CQI indicator in the grant of a persistent/semi-persistent UL resource allocation is the only control signaling sent by the network to command the multiple CQI reports.

In an exemplary embodiment, the CQI reports follow a mode detailed below and also seen at 3GPP TS 36.213 ver 8.2.0 at section 7.2.1. Note that in that reference the CQI report modes are for aperiodic CQI reports, whereas they are sent repeatedly across the persistently allocated UL resources according to these teachings (either each first transmission or each first transmission plus each re-transmission of that persistent/semi-persistent resource allocation).

Figure 1:
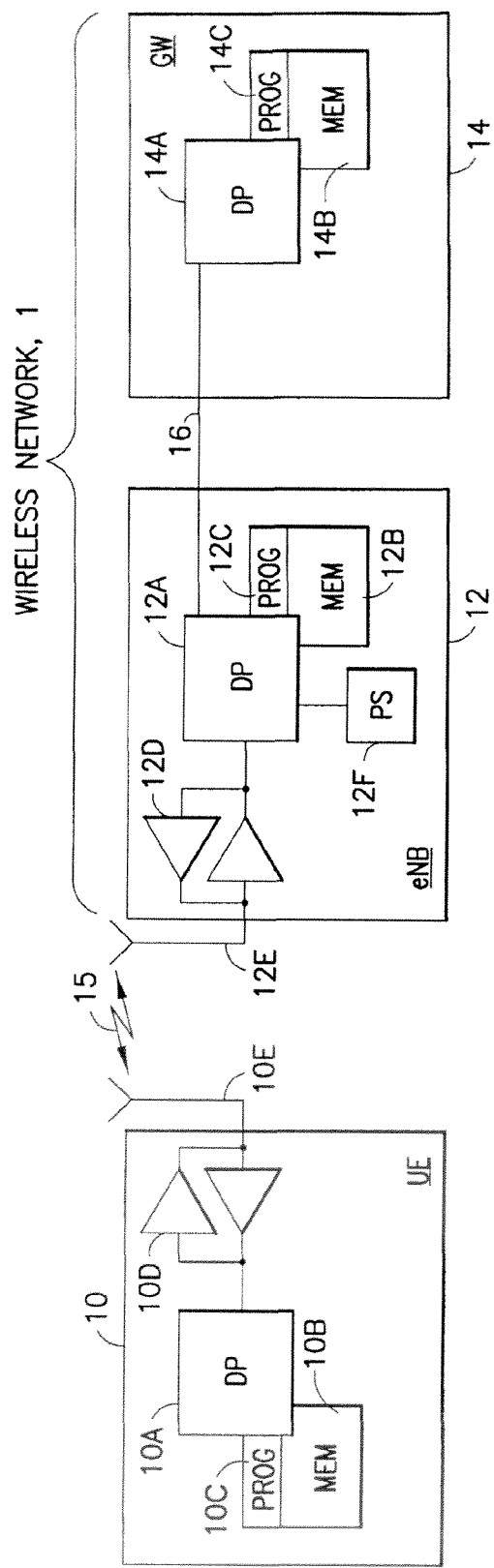
FIG. 1 shows a simplified block diagram of various electronic devices that are suitable for use in practicing the exemplary embodiments of this invention.

Before detailing those modes, reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a node B (e.g., base station or eNB) 12. The network 1 may include a higher controlling node generically shown as a gateway GW 14, which may be referred to variously as a radio network controller RNC, a user plane entity UPE, a mobility management entity MME, or a system architecture evolution gateway SAE-GW. The GW 14 represents a network node higher in the network than the eNB 12 and in certain embodiments the signaling detailed herein is independent of that GW 14, except to the extent the eNB 12 may sometimes pass certain information from the CQI reports it receives from the UE 10 to the GW 14.

The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a FROG 12C, and a suitable RF transceiver 12D. The eNB 12 may be coupled via a data path 16 (e.g., Iub or S1) to the serving or other GW 14. The eNB 12 and the UE 10 communicate over a wireless link 15, each using one or more antennas 12E, 10E (one antenna shown for each). In an embodiment, the wireless link 15 is a physical downlink control channel such as PDCCH and the uplink is a physical uplink shared channel such as the PUSCH. At least one of the PROGs 10C and 12C is assumed to include program instructions that, when executed by the associated DP, enable the electronic device to operate in accordance with the exemplary embodiments of this invention, as discussed below in greater detail.

Also within the eNB 12, either separate from or within the DP 12A, is a packet scheduler PS 12F that schedules the various UEs under its control for the various UL and DL radio resources. Once scheduled, the eNB 12 sends messages to the UEs with the scheduling grants (typically multiplexing grants for multiple UEs in one message/allocation table). Generally, the eNB 12 of an LTE system is fairly autonomous in its scheduling and need not coordinate with the GW/MME 14 excepting during handover of one of its UEs to another Node B. Also within each device 10, 12, 14 is a modem; for the UE 10 and eNB 12 such a modem is embodied within the respective transceiver 10D, 12D, and is embodied within the DP 12A, 14A of the respective eNB 12 and GW 14 for communicating over the data link 16 between them.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the PROGs 10C, 12C and 14C is assumed to include program instructions that, when executed by the associated DP, enable the electronic device to operate in accordance with the exemplary embodiments of this invention. Inherent in the DPs 10A, 12A, and 214A is a clock to enable synchronism among the various devices for transmissions and receptions within the appropriate time intervals and slots required, as the scheduling grants and the granted resources/subframes are time dependent.

In general, the exemplary embodiments of this invention may be implemented by computer software PROGs 10C, 12C, 14C embodied on the respective memories MEMs 10B, 12B, 14C and executable by the respective DPs 10A, 12A, 14A of the UE 10, eNB 12 and GW 14, or by hardware, or by a combination of software and/or firmware and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Figure 2A:
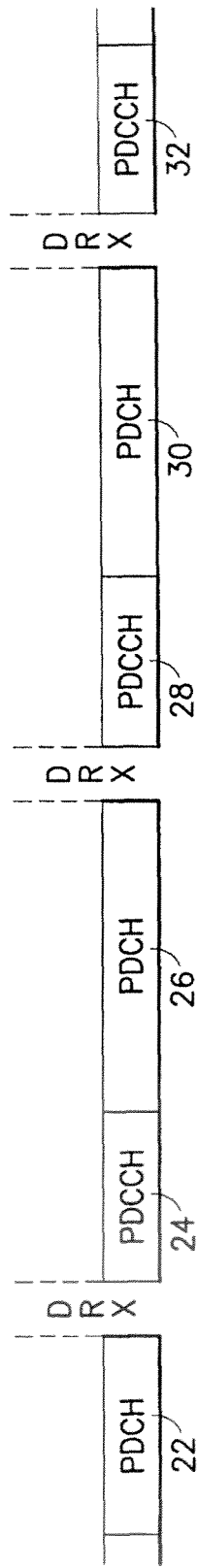
FIGS. 2A and 2B are schematic diagrams illustrating a discontinuous reception schedule in which resource allocations are received.

FIG. 2A shows a transmission where control (24) and data (26) alternate. One duty cycle of control and data represents a TTI (or sub-frame). Normally when a UE is scheduled to send its data, the eNB sends control signaling on the PDCCH and if the UE is allocated on the data channel, then the UE sends data on the PUSCH, which is the uplink version of the packet data channel PDCH. At a first data interval 22 the UE 10 may send data on the UL over a PDCH. Subsequently is a second interval or control interval 24 during which time the UE 10 is expected to monitor a control channel, shown by example as PDCCH. This series repeats in the illustrated intervals for data 26 and 30 and for control information 28 and 32.

Figure 2B:
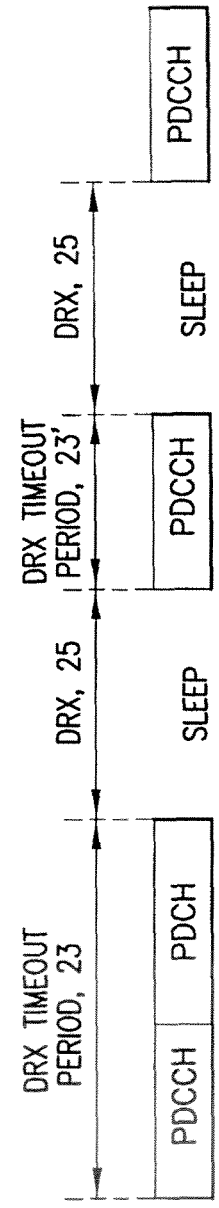

Relative to persistent/semi-persistent allocations, FIG. 2B illustrates communications in several successive intervals according to a DRX regimen, shown from the UE perspective. Upon entry into the network 1, the UE 10 is given a DRX schedule (e.g., monitor PDCCH at intervals of 20 ms), until the UE's DRX schedule is changed by the network, such as when handed over to another eNB. Typically the UE is provided DRX parameters upon entry into the cell/network. The length of time during which the UE 10 is instructed/expected to monitor the control channel is termed the DRX timeout period 23, and the UE is active. The length of time between DRX timeout periods 23 is termed the DRX 25, and is when the UE is idle (with some waking to monitor for a page if the DRX is particularly long). In the event a UE 10 receives the PDCCH during the DRX timeout period and is not allocated (assuming dynamic allocation), it may enter a sleep mode for the duration of the DRX and awake for the next DRX timeout period to check if it is allocated there. If the UE is allocated, it only need monitor (or send on the UL) that portion of the data interval for which the allocation is valid. The length of the DRX and the DRX timeout period may be set by the network 1. The DRX timeout period is also sometimes referred to as a duty cycle, the length of the 'reception window' per DRX. For example, a duty cycle of 2 means the UE 10 receives two successive AT/PDCCHs per DRX. In current practice one AT/PDCCH spans one TTI (or sub-frame of 1 ms or two slots each of 0.5 ms). A typical DRX for VoIP implementations is 20 ms minus the DRX timeout period.

In dynamic scheduling, the UE 10 is authorized by the network 1, on the PDCCH 24 during a DRX timeout period 23, a resource allocation by which it is to receive data (or to transmit its data) during the next data interval PDCH 26. Since it is dynamic, that resource allocation is valid only for the data interval following the DRX timeout period in which the allocation was received. Multiple UEs may be allocated in the same DRX timeout period 23 different allocations for the same data interval, but the resources allocated are unique so that packets/transmissions directed to or sent from different ones of those multiple allocated UEs do not interfere with one another though received/sent in the same data interval 26. Each resource allocation identifies the UE to which it is intended, such as through a c-RNTI (radio network temporary identifier) or other identifier unique in the cell, so the same PDCCH can be shared by the multiple UEs. A persistent or semi-persistent resource allocation is one in which a resource allocation received in a DRX timeout period remains valid for more than data interval, and in FIG. 2B the persistent/semi-persistent allocation would extend to another PDCH that lies within the next depicted DRX 25.

Figure 3:
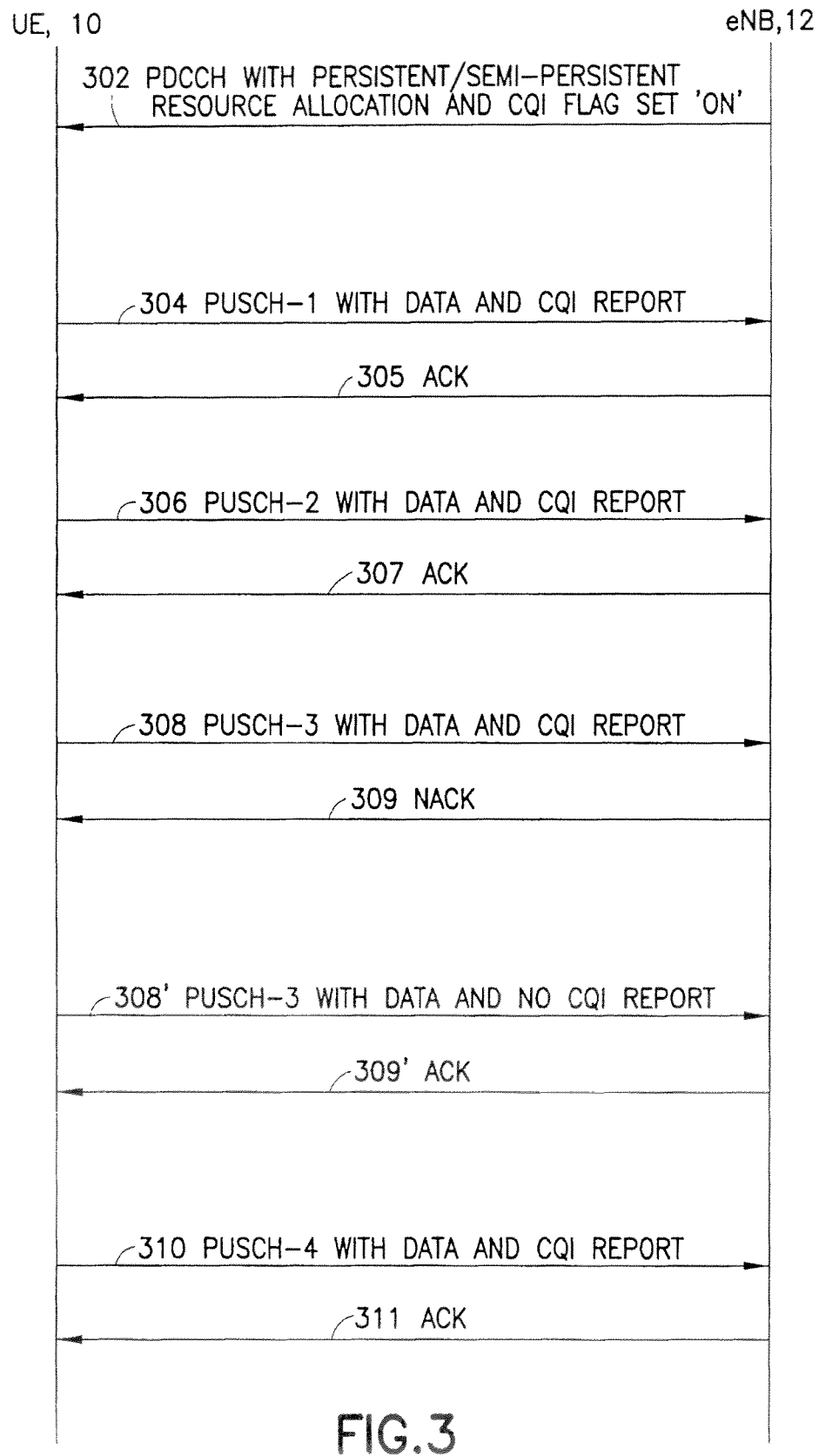
FIG. 3 is a signalling diagram showing communications according to embodiments of the invention.

Consider now FIG. 3, which is a signalling diagram showing a persistent/semi-persistent resource allocation and the UE's use of those resources. At 302 the eNB 12 sends the PDCCH that has the persistent (or semi-persistent) UL resource allocation for the UE 10, and also with the CQI flag set to 'on' (e.g., bit 1 or 0 as mutually understood by both the eNB and UE). The UE maps the PDCCH to its allocated UL resource and at 304 sends on the PUSCH its data with the CQI report embedded (302 is designated PUSCH-1 to indicate this is the first data transmission on the PUSCH under the persistent resource). The eNB 12 sends an acknowledgement ACK 305 for PUSCH-1. At 306 the UE 10 sends PUSCH-2 with an embedded CQI report according to the persistent/semi-persistent resource allocation 302, and again the eNB 12 sends its ACK 307.

Now in one embodiment the UE 10 sends PUSCH-3 with an embedded CQI report 308 but receives a negative acknowledgement NACK 309 from the eNB 12, and so the UE 10 uses its next instance of the persistently/semi-persistently allocated UL resource to re-transmit 308' the data of PUSCH-3 but without any CQI report. The eNB 12 receives that retransmission 308' and sends an ACK 309'. As the persistent/semi-persistent resource allocation continues, the UE 10 sends in the next instance allocated by the PDCCH 302 a PUSCH-4 with an embedded CQI report 310, to which the eNB 12 sends an ACK 311. For the case where the resource allocation 302 is semi-persistent, the re-transmission 308' is not sent on the semi-persistently allocated UL resource but must be explicitly (dynamically) scheduled by the eNB in another PDCCH.

In another embodiment of the invention and valid for either or both persistent and semi-persistent resource allocation, for the case where there is a re-transmission as at 308', the re-transmitted data is sent embedded with a CQI report. In one variation the CQI report embedded into the re-transmission is the same one the eNB 12 failed to receive as indicated by the NACK 309. In another variation the UE 10 compiles a new CQI report since a bit of time has elapsed from the time it first compiled the one which drew the NACK 309.

One concise way to state an exemplary embodiment of the invention is that, if in the PDCCH UL grant which is used for configuring the persistent (or semi-persistent) allocation the aperiodic CQI request flag is set to value "on", the UE shall embed a CQI with the PUSCH reporting mode configured for aperiodic reporting into each of the persistent (or semi-persistent) first transmissions.

Embodiments of this invention offer several benefits. First, this is readily adoptable into existing wireless protocol since it is in line with previous agreements for persistent scheduling. Second, there is no need to define any new physical signals; the existing mechanisms are combined and enabled with some scheduling rules. Third, the possibility of combining periodic PUSCH CQI reporting together with a persistent data allocation allows for more detailed frequency information to be available than what simple PUCCH based CQI formats could offer. This information can be efficiently utilized with e.g. scheduled retransmissions, simultaneous dynamic transmissions and reallocation of persistent transmissions. Fifth, it is seen to align easily and seamlessly with DRX/DTX patterns when compared to PUCCH based CQI reporting, as there is only the need to configure the DTX/DRX pattern for the data.

Now are described briefly the different modes for the CQI reports. To provide for a more seamless integration into existing understanding of LTE protocols, these modes are taken from 3GPP TS 36.213 (v 8.2.0) at sections 7.1 through 7.1.4 and also 7.2.1. Specifically, there are four modes relevant to the CQI reports. The UE is semi-statically configured via higher layer signaling to receive the physical downlink shared channel based on one of these four transmission modes, which include: 1) single-antenna port (the eNB's transmission of the PDCCH); 2) transmit diversity (of the eNB's transmission of the PDCCH); 3) open-loop spatial multiplexing (based on the rank indication RI the UE determines, the UE assumes the eNB transmits on the PDCCH according to transmit diversity if RI=1, and according to large delay CDD (cyclic delay diversity) if RI>1; and 4) closed-loop spatial multiplexing (the UE assumes that the eNB transmits on the PDCCH according to zero/small delay CDD). It is noted that a recent change request (document R1-082254, 3GPP TSG-RAN Meeting #53, Kansas City, Mo., USA, May 5-9, 2008), which is attached to the priority document as exhibit B, expands the number of transmission modes to seven, and adds: 5) multi-user MIMO (multiple input multiple output); 6) closed loop with rank=1 precoding; and 7) another single antenna port [a different port than used for #1) above].

Each of the original four transmission modes maps to a CQI report mode at table 7.2.1-1 of 3GPP TS 36.213 (v 8.2.0), and the mapped CQI report mode is the one the UE uses for the CQI reports that it sends with its UL data (or at least its first-transmission UL data and in some embodiments also re-transmissions of data) on the persistently or semi-persistently allocated resource PUSCH that it receives on the PDCCH.

Respecting the proposed seven transmission modes at document R1-082254, the seven modes map to a DCI format (dedicated control information format 1A, 1B or 2) as shown at table 7.1-1 of that document. The UE is semi-statically configured with a transmission mode to receive PDSCH (physical downlink shared channel) data transmissions with a reference DCI format based on that table 7.1-1, which is signaled by a PDCCH in its UE specific search spaces. Relevant to these teachings, a UE is configured to use the PUCCH or PUSCH (physical uplink shared channel) feedback mode corresponding to its reference DCI format.

For the aspects of this invention related to the network/eNB, embodiments of this invention may be implemented by computer software executable by a data processor of the Node B 12, such as the processor 12A shown, or by hardware, or by a combination of software and hardware. For the aspects of this invention related to the UE, embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

Further details and implementations are described particularly below with reference to FIG. 4. From the perspective of the UE, exemplary embodiments of this invention encompass a method; an apparatus that includes a processor, memory, transmitter and receiver; and a memory embodying a computer program; that operate to receive at block 402 a persistent or a semi-persistent uplink resource allocation (PDCCH) in a transmission mode that is configured by the network, where the received allocation also comprises an indication to send channel quality reports. At block 404 the UE maps the transmission mode to a CQI reporting mode (e.g., PUSCH/CQI reporting mode of TS 36.213 at sec. 7.2.1, which is attached as Exhibit A to the priority document). At blocks 406 and 414 and for all corresponding instances of the persistently/semi-persistently allocated uplink resource other than those following a NACK, the UE sends a corresponding set of user data and a corresponding CQI report according to the mapped reporting mode.

If in reply to an instance of the UE sending its user data and a CQI report it receives a NACK, then for the case where the allocation is persistent (and responsive to the NACK), then the UE re-sends at block 410 in a next instance of the persistently allocated uplink resource following the NACK the NACK'd (previous) set of user data and no CQI report, and receives an ACK in reply. If in reply to an instance of the UE sending its user data and a CQI report it receives a NACK, then for the case where the allocation is semi-persistent (and responsive to the NACK), then at block 412 the UE receives a dynamic resource allocation for an uplink resource, re-sends the NACK'd set of user data and no CQI report on the dynamically allocated resource, and receives an ACK in reply. As noted above, the CQI report may be included in these re-sending of user data according to an embodiment.

In more general terms, in an exemplary embodiment of the invention there is a memory storing a program of executable instructions, a device such as the UE or a component or components thereof, and a method by which the UE receives a persistent or a semi-persistent uplink resource allocation that also comprises an indication to send channel quality reports; the UE determines a CQI report format, and in at least first transmissions of user data for instances of the persistently allocated uplink resource the UE sends user data and a CQI report according to the determined format. For the case that a NACK is received in reply to one of those sent user data with CQI reports, four options are detailed: re-send the NACK'd user data on a next instance of the persistently allocated UL resource with or without a CQI report, and re-send the NACK'd user data on a dynamically allocated uplink resource with or without a CQI report.

Figure 4:
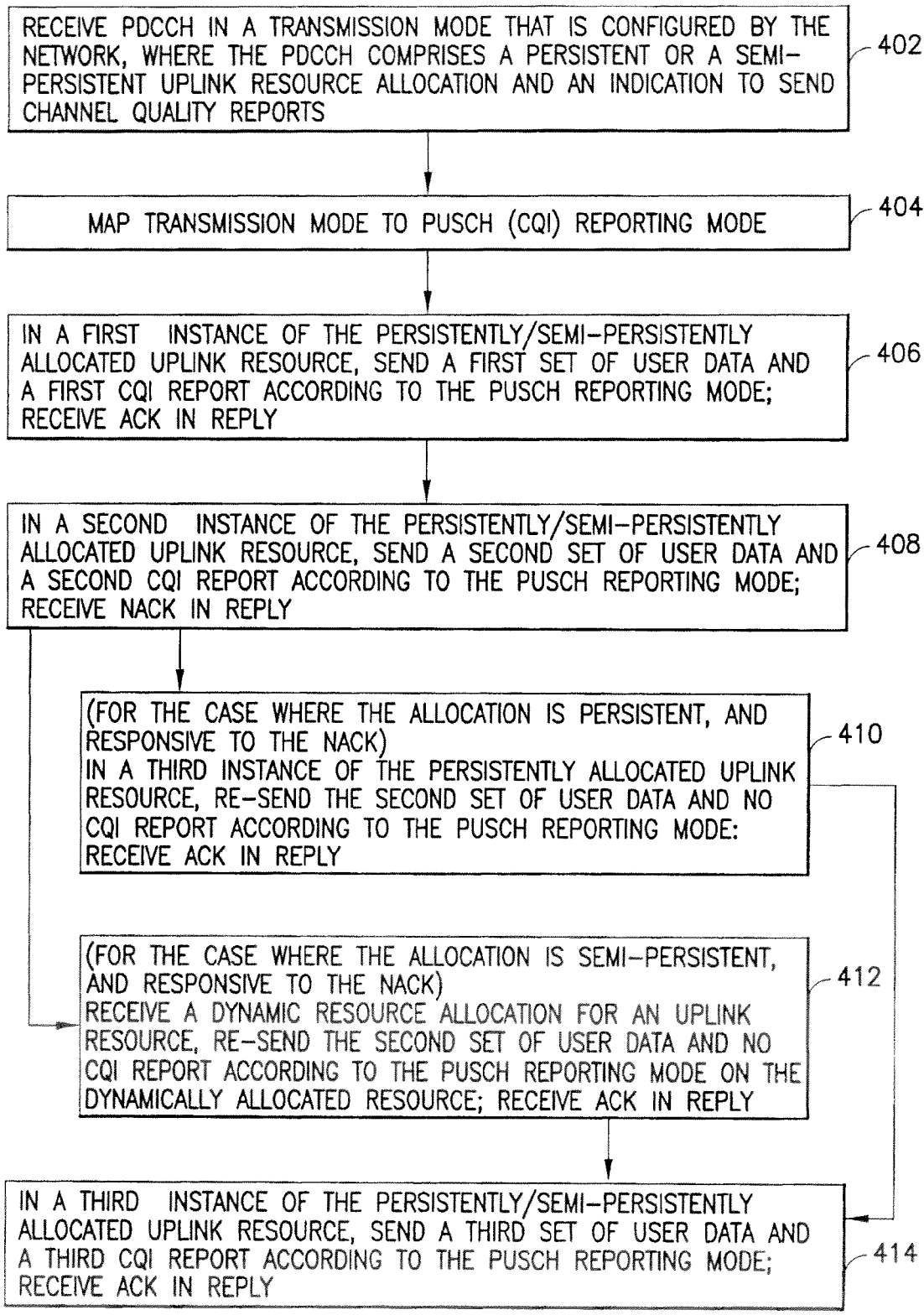
FIG. 4 is a logical flow diagram that illustrates process steps according to different embodiments of the invention.

Note that the various blocks shown in FIG. 4 for the UE (and their mirror transmissions/receptions for the eNB) may be viewed as method steps, and/or as actions that result from execution of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. For example, certain steps shown in FIG. 3 may be executed in other than the order shown, and certain of the computations described may be performed in other ways. However, all such and similar modifications of the teachings of this invention will still fall within the scope of this invention.

Further, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other types of wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

We claim:

1. A computer-program product comprising a non-transitory computer-readable storage medium bearing computer program code embodied therein for use with a computer, the computer program code comprising:
   code for receiving at a receiver a persistent or a semi-persistent uplink resource allocation that also comprises an indication to send channel quality reports;
   code for determining by a processor a format for a channel quality report; and
   code for sending from a transmitter user data and a channel quality report according to the determined format in at least first transmissions of user data for instances of the persistently or semi-persistently allocated uplink resource.

2. The computer program product according to claim 1, wherein, for the case that a negative acknowledgement is received in reply to one of the sent user data with channel quality report, the computer program code further comprises:
   code for responding to the negative acknowledgement by re-sending in a next instance of the persistently or semi-persistently allocated uplink resource the negatively acknowledged user data with either the negatively acknowledged channel quality report or a new channel quality report.

3. The computer program product according to claim 1, wherein, for the case that a negative acknowledgement is received in reply to one of the sent user data with the channel quality report, the computer program code further comprises:
   code for responding to the negative acknowledgement by re-sending in a next instance of the persistently or semi-persistently allocated uplink resource the negatively acknowledged user data without any channel quality report.

4. The computer program product according to claim 1, wherein, for the case that a negative acknowledgement is received in reply to one of the sent user data with the channel quality report, the computer program code further comprises:
   code for responding to the negative acknowledgement by re-sending on a dynamically scheduled uplink resource the negatively acknowledged user data with either the negatively acknowledged channel quality report or a new channel quality report.

5. The computer program product according to claim 1, wherein, for the case that a negative acknowledgement is received in reply to one of the sent user data with the channel quality report, the computer program code further comprises:
   code for responding to the negative acknowledgement by re-sending on a dynamically scheduled uplink resource the negatively acknowledged user data without any channel quality report.

6. The computer program product according to claim 1, wherein the indication to send channel quality reports comprises a single bit.

7. The computer program product according to claim 1, wherein the format for the channel quality report is determined by mapping from a transmission mode to one of several channel quality report formats, wherein a user equipment that is executing the method is configured to receive a downlink shared channel according to the transmission mode used for the mapping.

8. A computer-program product comprising a non-transitory computer-readable storage medium bearing computer program code embodied therein for use with a computer, the computer program code comprising:
   code for sending from a transmitter to a user equipment a persistent or a semi-persistent uplink resource allocation that also comprises an indication to send channel quality reports; and
   code for receiving at a receiver from the user equipment user data and a channel quality report in at least first transmissions of user data for instances of the persistently or semi-persistently allocated uplink resource.

9. The computer program product according to claim 8, wherein the computer program code further comprises:
   code for sending from the transmitter a negative acknowledgement for one of the instances of the persistently or semi-persistently allocated uplink resource for which the user data and/or the channel quality report was not properly received; and
   in response to sending the negative acknowledgement, code for receiving at the receiver from the user equipment in a next instance of the persistently or semi-persistently allocated uplink resource one of:
      the negatively acknowledged user data with the negatively acknowledged channel quality report; or
      the negatively acknowledged user data with a new channel quality report; or
      the negatively acknowledged user data without any channel quality report.

10. The computer program product according to claim 8, wherein the computer program code further comprises:
   code for sending from the transmitter a negative acknowledgement for one of the instances of the persistently or semi-persistently allocated uplink resource for which the user data and/or the channel quality report was not properly received;
   code for sending from the transmitter to the user equipment a dynamically scheduled uplink resource allocation; and
   code for receiving at the receiver from the user equipment on the dynamically scheduled uplink resource one of:
      the negatively acknowledged user data with the negatively acknowledged channel quality report; or
      the negatively acknowledged user data with a new channel quality report; or
      the negatively acknowledged user data without any channel quality report.

11. The computer program product according to claim 8, wherein the computer program code further comprises:
   code for configuring the user equipment to receive a downlink shared channel according to one of a plurality of transmission modes; and
   code for mapping from the configured transmission mode to one of a plurality of channel quality report formats, wherein the received channel quality report is according to the mapped one channel quality report format.

12. An apparatus comprising:
   a memory embodying a computer program; and
   at least one processor;
   wherein the memory with the computer program is configured with the at least one processor to cause the apparatus at least to:
   receive a persistent or a semi-persistent uplink resource allocation that also comprises an indication to send channel quality reports;
   determine a format for a channel quality report; and
   send, in at least first transmissions of user data for instances of the persistently or semi-persistently allocated uplink resource, user data and a channel quality report according to the determined format, wherein the indication to send channel quality reports comprises a single bit.

13. An apparatus comprising:
a memory embodying a computer program; and
at least one processor;
wherein the memory with the computer program is configured with the at least one processor to cause the apparatus at least to:
receive a persistent or a semi-persistent uplink resource allocation that also comprises an indication to send channel quality reports;
determine a format for a channel quality report; and
send, in at least first transmissions of user data for instances of the persistently or semi-persistently allocated uplink resource, user data and a channel quality report according to the determined format,
wherein the format for the channel quality report is determined by mapping from a transmission mode to one of several channel quality report formats, wherein a user equipment is configured to receive a downlink shared channel according to the transmission mode used for the mapping.

* * * * *